(12) United States Patent
Park (10) Patent No.: US 8,609,275 B2
(45) Date of Patent: Dec. 17, 2013

(54) CONNECTIVE STRUCTURE BETWEEN A BATTERY CELL AND A CONNECTING BAR OF A BATTERY PACK

(75) Inventor: Sanghun Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/110,141

(22) Filed: May 18, 2011

(65) Prior Publication Data

US 2012/0052366 A1 Mar. 1, 2012

(30) Foreign Application Priority Data

Sep. 1, 2010 (KR) .................. 10-2010-0085453

(51) Int. Cl.
*H01M 2/24* (2006.01)
*H01M 6/42* (2006.01)
*H01M 6/00* (2006.01)
*H01M 10/00* (2006.01)
*H01M 10/38* (2006.01)
*H01M 2/26* (2006.01)
*H01M 2/28* (2006.01)

(52) U.S. Cl.
USPC ........... 429/158; 429/122; 429/123; 429/160; 429/161

(58) Field of Classification Search
USPC .................. 429/122, 123, 158, 160, 161
See application file for complete search history.

(56) References Cited

U.S. PATENT DOCUMENTS

| | | | |
|---|---|---|---|
| 4,740,657 A * | 4/1988 | Tsukagoshi et al. | 174/88 R |
| 6,861,821 B2 * | 3/2005 | Masumoto et al. | 320/107 |
| 2002/0014615 A1 | 2/2002 | Yamada et al. | |
| 2003/0170535 A1 | 9/2003 | Watanabe et al. | |
| 2004/0184947 A1 * | 9/2004 | Tanaka | 420/577 |
| 2005/0287427 A1 | 12/2005 | Kim et al. | |
| 2006/0032667 A1 | 2/2006 | Sato | |
| 2008/0036034 A1 * | 2/2008 | Juskey et al. | 257/531 |
| 2008/0241667 A1 * | 10/2008 | Kohn et al. | 429/159 |
| 2009/0104513 A1 | 4/2009 | Um | |

FOREIGN PATENT DOCUMENTS

| | | | |
|---|---|---|---|
| JP | 2000-195339 | 7/2000 | |
| JP | 2007194035 | 8/2007 | |
| JP | 2010-089646 | * 4/2010 | ............. B60R 16/02 |
| KR | 10-2005-0026327 | 3/2005 | |
| KR | 102005099505 | 10/2005 | |
| KR | 10-2006-0028169 | 3/2006 | |
| KR | 1020060028170 | 3/2006 | |

(Continued)

OTHER PUBLICATIONS

NASA circle and ellipse Sep. 18, 2004 {http://www-spof.gsfc.nasa.gov/stargaze/Sellipse.htm}.*

(Continued)

*Primary Examiner* — Patrick Ryan
*Assistant Examiner* — Aaron Greso
(74) *Attorney, Agent, or Firm* — Robert E. Bushnell, Esq.

(57) ABSTRACT

A battery pack having an improved a coupling force between a battery cell and a connecting bar of a connecting structure. The connecting structure includes at least one battery cell, a connecting bar electrically connected to the battery cell, a welding region formed at a connecting area of the battery cell and the connecting bar, and an anisotropic conductive film formed at the outer periphery of the welding region and connecting the battery cell and the connecting bar to each other.

14 Claims, 9 Drawing Sheets

(56) References Cited

FOREIGN PATENT DOCUMENTS

| KR | 10-0601515 | | 7/2006 | |
|---|---|---|---|---|
| KR | 10-0624155 | | 9/2006 | |
| KR | 10-2007-0079219 | | 8/2007 | |
| KR | 10-2008-0092772 | * | 10/2008 | ............... C09J 9/02 |
| WO | WO 97/15932 | * | 5/1997 | ............... H01B 1/12 |
| WO | WO 03/003485 | * | 1/2003 | ............... H01M 2/10 |

OTHER PUBLICATIONS

Real Dictionary Plate (C) 2001 avail May 26, 2003 Princeton University, [Princeton NJ] realdictionarycom {http://www.realdictionary.com/?q=plate}.*

Korean Office Action issued on Nov. 24, 2011 in connection with Korean Patent Application Serial No. 10-2010-0085453 and Request for Entry of the Accompanying Office Action attached herewith.

* cited by examiner

CONNECTIVE STRUCTURE BETWEEN A BATTERY CELL AND A CONNECTING BAR OF A BATTERY PACK

CLAIM OF PRIORITY

This application makes reference to, incorporates the same herein, and claims all benefits accruing under 35 U.S.C §119 from an application entitled: CONNECTING STRUCTURE BETWEEN BATTERY CELL AND CONNECTING TAB earlier filed in the Korean Industrial Property Office on Sep. 1, 2010, and there duly assigned Serial No. 10-2010-0085453 by that Office.

BACKGROUND OF THE INVENTION

1. Field of the Invention

The present invention relates to battery pack with improved a connective structure between a battery cell and a connecting bar.

2. Description of the Related Art

In general, a single battery cell is difficult to be directly used as a power supply for operating notebook computers, electronic devices, electric vehicles, electric scooters, or the like. Therefore, a plurality of battery cells, which are connected to each other in series or parallel, are packaged into a battery pack used as the power supply for such electric or electronic devices.

In addition, a protective circuit module for controlling charging and discharging of a battery cell and preventing various risks from being generated due to overcharge, overdischarge or over-current is assembled with the battery pack.

SUMMARY OF THE INVENTION

An embodiment of the present invention is to provide battery pack having a connective structure between a battery cell and a connecting bar, which can improve a coupling force between the battery cell and the connecting bar.

An embodiment of the present invention may be realized by providing a connecting structure including at least one battery cell, a connecting bar electrically connected to the battery cell, a welding region formed at a connecting area of the battery cell and the connecting bar, and an anisotropic conductive film formed at the outer periphery of the welding region and connecting the battery cell and the connecting bar to each other.

A welding reinforcement portion may further be formed at the outer periphery of the anisotropic conductive film, and the welding reinforcement portion may connect the battery cell and the connecting bar to each other.

The welding reinforcement portion may be an insulating adhesive. The welding reinforcement portion may be a double-sided adhesive tape.

An area of the anisotropic conductive film may be larger than that of the welding region.

The anisotropic conductive film may electrically connect the battery cell and the connecting bar to each other.

The welding region may be elliptically shaped. In addition, the welding region may be made of nickel (Ni) of the connecting bar, steel (e.g. stainless steel) of the battery cell, and gold (Au) and nickel (Ni) of the anisotropic conductive film, mixed altogether. Further, the welding region may include a nugget region that is a trace of current flow based on a welding region, and a corona bond region formed outside the nugget region by melting and curing of the nugget region.

The connecting bar may include a planar portion formed at a location corresponding to the welding region, and a tilted portion upwardly bent around the planar portion.

In addition, the connecting bar may include a first planar portion formed at a location corresponding to the welding region, a sloping portion upwardly bent about the planar portion, and a second planar portion horizontally bent about the sloping portion. The connecting bar may be flatly formed.

As described above, according to one embodiment of the present invention, since the connecting structure between a battery cell and a connecting bar further includes an anisotropic conductive film at the exterior side of a welding region, a coupling force between the battery cell and the connecting bar can be improved.

Alternatively, the connecting structure between a battery cell and a connecting bar further includes a welding reinforcement portion at the exterior side of an anisotropic conductive film, a coupling force between the battery cell and the connecting bar can further be improved.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, certain exemplary embodiments of the present invention are shown and described, by way of illustration. As those skilled in the art would recognize, the described exemplary embodiments may be modified in various ways, all without departing from the spirit or scope of the present invention.

Figure 1:
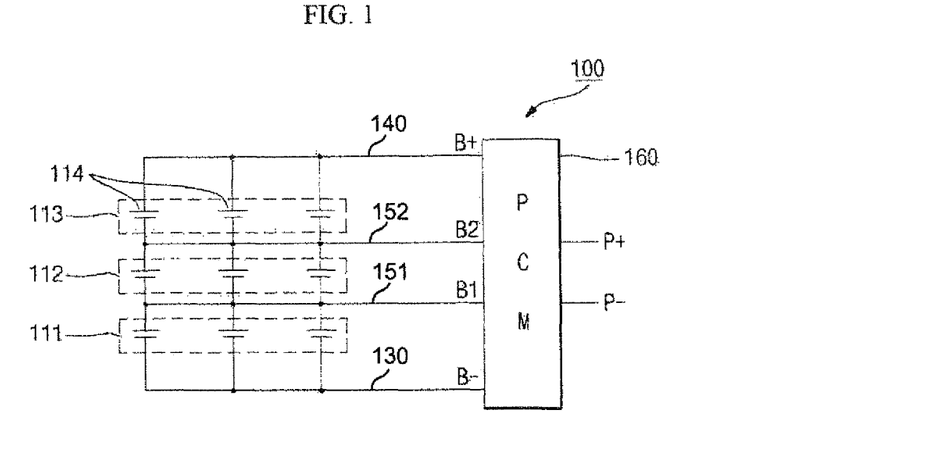
FIG. 1 is a schematic circuit diagram of a battery pack.
Figure 2:
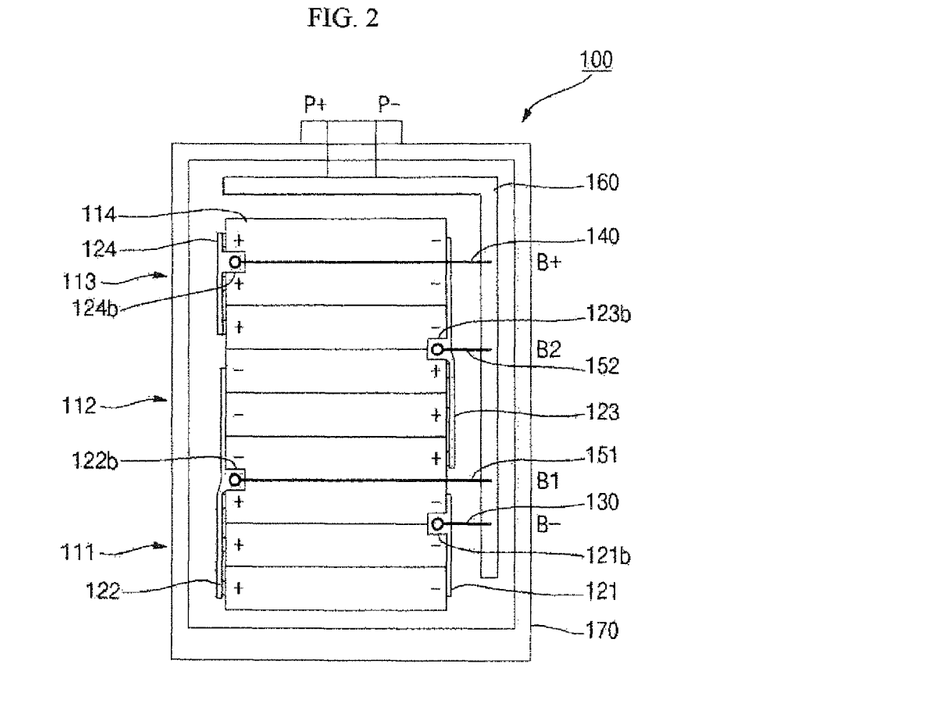
FIG. 2 is a plan view of an exemplary battery pack employing the circuit shown in FIG. 1.

FIG. 1 is a schematic circuit diagram of a battery pack, and FIG. 2 is a plan view of an exemplary battery pack employing the circuit shown in FIG. 1.

An exemplary battery pack is illustrated in FIG. 1 and FIG. 2 for a better understanding of the present invention, but aspects of the present invention are not limited thereto.

As illustrated in FIG. 1 and FIG. 2, battery pack 100 includes one or more banks 111, 112, and 113, one or more connecting bars 121,122,123, and 124 connecting the respective banks 111,112, and 113 to each other, a minimum power supply wire 130, a maximum power supply wire 140, sensing wires 151 and 152, and a protective circuit module 160.

The banks 111, 112, and 113 include a first bank 111, a second bank 112 and a third bank 113. At least two battery cells 114 are connected in parallel in each of the banks 111, 112, and 113, and the respective banks 111, 112, and 113 are connected in series to each other. Three of the banks 111, 112, and 113 are illustrated in FIGS. 1 and 2, but the present invention does not limit the number of banks thereto. In the illustrated embodiment, each of the banks 111, 112, and 113 also includes three battery cells 114, but the present invention does not limit the number of battery cells 114 thereto.

The connecting bars 121, 122, 123, and 124 include a first connecting bar 121, a second connecting bar 122, a third connecting bar 123, and a fourth connecting bar 124. The first connecting bar 121 is connected to the minimum power supply of the first bank 111, that is, a negative electrode. In other words, the first connecting bar 121 is connected in parallel to a negative electrode of the battery cell 114 forming the first bank 111. The second connecting bar 122 connects the first bank 111 and the second bank 112 in series to each other. The second connecting bar 122 is connected in parallel to a negative electrode of the battery cell 114 forming second bank 112 while being connected in parallel to a positive electrode of the battery cell 114 forming the first bank 111. The third connecting bar 123 connects the second bank 112 and the third bank 113 in series to each other. The third connecting bar 123 is connected in parallel to a negative electrode of the battery cell 114 forming the third bank 113 while being connected in parallel to a positive electrode of the battery cell 114 forming the second bank 112. The fourth connecting bar 124 is connected to the maximum power supply of the third bank 113, that is, a positive electrode. In other words, the third connecting bar 123 is connected in parallel to a positive electrode of the battery cell 114 forming the third bank 113. Here, the number of the connecting bars 121, 122, 123, and 124 increases as the number of the banks 111,112,123 used.

The minimum power supply wire 130 is soldered to a minimum power supply area of the first bank 111. That is to say, the minimum power supply wire 130 has one end soldered to a region (tab) 121b of the first connecting bar 121.

The maximum power supply wire 140 is soldered to a maximum power supply area of the third bank 113. That is to say, the maximum power supply wire 140 has one end soldered to a region (tab) 124b of the fourth connecting bar 124.

In the illustrated embodiment, two of the sensing wires 151 and 152 are provided. For convenience of explanation, the sensing wires 151 and 152 are distinctly referred to as a first sensing wire 151 and a second sensing wire 152. The first sensing wire 151 has one end soldered to a region (tab) 122b of the second connecting bar 122. In addition, the second sensing wire 152 has one end soldered to a region (tab) 123b of the third connecting bar 123. Of course, the number of the sensing wires 151 and 152 also increases as the number of banks and the number of connecting bars increase.

As shown in FIG. 2, the protective circuit module 160 is integrally formed on side and top portions of the first, second and third banks 111, 112, and 113. That is to say, in one embodiment, the protective circuit module 160 may be substantially "inverted L" shaped, but aspects of the present invention are not limited thereto.

The minimum power supply wire 130 is connected to a B- terminal of the protective circuit module 160, the first sensing wire 151 is connected to a B1 terminal, the second sensing wire 152 is connected to a B2 terminal, and the maximum power supply wire 140 is connected to a B+ terminal. The protective circuit module 160 has a P+ terminal and a P- terminal formed on its top surface. The P+ terminal and the P- terminal are connected to an external charger or an external set. Reference numeral 170 denotes a pack case in which the aforementioned components are mounted.

Figure 3:
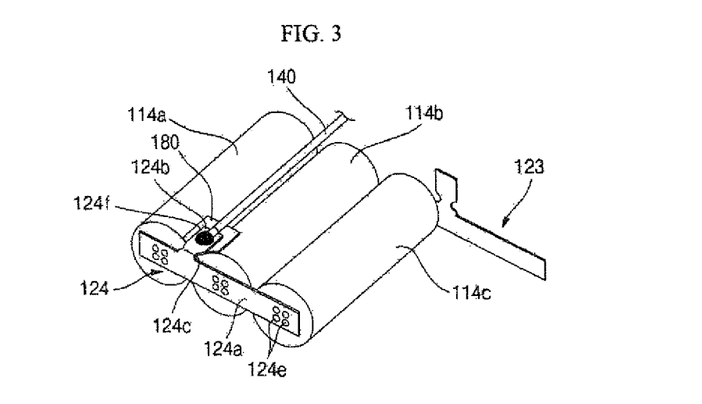
FIG. 3 is a partial perspective view illustrating a connection relationship between a battery cell and a connecting bar according to an embodiment of the present invention.

FIG. 3 is a partial perspective view illustrating a connection relationship between a battery cell and a connecting bar according to an embodiment of the present invention.

In the following description, the connecting bar will be described with regard to the fourth connecting bar 124 by way of example, but it should be understood that the present invention may be applied to the first to third connecting bars 121 to 123 as well.

As illustrated in FIG. 3, the connecting bar 124 according to the present invention includes a first region 124a and a second region (tab) 124b. More specifically, the first region 124a and the second region (tab) 124b may be substantially inverted "T" shaped, but aspects of the present invention are not limited thereto. In addition, the connecting bar 124 including the first region 124a and the second region (tab) 124b may be one selected from nickel (Ni), copper (Cu), aluminum (Al) and equivalents thereof, but aspects of the present invention are not limited thereto.

The first region 124a is substantially rectangular plate shaped, and is welded to a surface of a positive or negative electrode of each of the battery cells 114a to 114c. The second region 124b is also substantially rectangular plate shaped, and forms a tab that extends from the first region 124a by a predetermined length to then be soldered with the wire 140. As shown, the second region, or tab, 124b is bent at a predetermined angle, preferably a right angle, with respect to the plane of the first region 124a.

Of course, the first region 124a and the second region 124b may have various shapes, instead of rectangular shape, according to the positional relationship between the battery cells 114a to 114c, the number of battery cells used, or the like, but aspects of the present invention are not limited thereto.

Meanwhile, in order to facilitate bending, at least one cut portion 124c is formed at the second region 124b which is a boundary area with the first region 124a. That is to say, the at least one tapering cut portion 124c is formed at the second region 124b, thereby allowing the second region 124b to be easily bent.

In addition, an insulator sheet 180 is positioned between the bent second region 124b and the battery cell 114a, 114b, thereby preventing an electrical short between the second region 124b and the battery cell 114a, 114b.

Reference numeral 124e denotes a welding trace produced after welding the first region 124a to the battery cell 114c, and reference numeral 124f denotes a soldering trace produced after soldering the wire 140 to the second region 124b.

As shown in FIG. 2 and FIG. 3, the first region 124a of the connecting bar 124 is welded to the positive electrode of each of the battery cells 114a to 114c of bank 113, so that the battery cells 114a to 114c are connected in parallel to each other. In addition, one side of the connecting bar 123 is welded to the negative electrodes of each of the battery cells 114a to 114c and the other side of the connecting bar 123 is welded to the negative electrodes of the battery cells of bank 112, so that the battery cells are connected in series to each other. However, the present invention does not limit the connection method to the above-described connection method.

A connecting structure between the battery cell and the connecting bar according to an embodiment of the present invention will now be described in more detail, reference numerals used herein are newly defined.

Figure 4A:
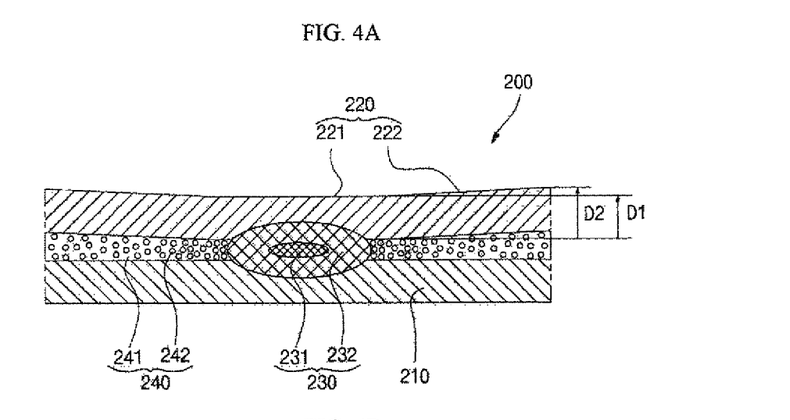
FIG. 4A is a partial cross-sectional view of a connecting structure between a battery cell and a connecting bar according to an embodiment of the present invention.
Figure 4B:
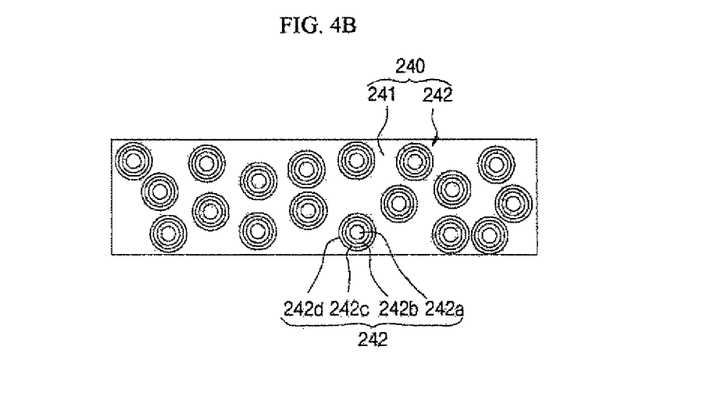
FIG. 4B is a cross-sectional view illustrating an exemplary anisotropic conductive film.

FIG. 4A is a partial cross-sectional view of a connecting structure between a battery cell and a connecting bar according to an embodiment of the present invention, and FIG. 4B is a cross-sectional view illustrating an exemplary anisotropic conductive film.

First, as illustrated in FIG. 4A, the connecting structure 200 between a battery cell and a connecting bar includes a battery cell 210, a connecting bar 220, a welding region 230, and an anisotropic conductive film 240.

The battery cell 210 may be one selected from a general lithium ion battery, a lithium polymer battery, a lithium polymer ion battery and equivalents thereof, but aspects of the present invention are not limited thereto. In addition, the battery cell 210 may be one selected from a cylindrical battery, a rectangular battery and equivalents thereof, but aspects of the present invention are not limited thereto.

In practice, the battery cell 210 shown in FIG. 4A may be an external case such as a can or a cap plate. The can or cap plate may be made of one selected from steel, a metal alloy, stainless steel (SUS), aluminum (Al), Al alloy, copper clad stainless steel, copper clad stainless-steel with a gold plating, iron (Fe) or iron sulfide (FeS or FeS 2), and equivalents thereof, but aspects of the present invention are not limited thereto.

The connecting bar 220 is electrically connected to the battery cell 210. The connecting bar 220 may be made of one selected from nickel (Ni), Ni alloy, aluminum (Al), Al alloy, copper (Cu), Cu alloy, steel, metal alloy and equivalents thereof, but aspects of the present invention are not limited thereto. In addition, the connecting bar 220 is electrically and mechanically connected to the battery cell 210 using the welding region 230 and the anisotropic conductive film 240.

The connecting bar 220 includes a substantially flat planar portion 221 formed at a location corresponding to the welding region 230, and a sloping portion 222 upwardly bent about the planar portion 221. Thus, in the connecting bar 220, a height D1 of the planar portion 221 formed at the location corresponding to the welding region 230 is different from a height D2 of the sloping portion 222 formed outside the planar portion 221. Here, the height D2 of the sloping portion 222 is greater than the height D1 of the planar portion 221.

The welding region 230 is formed at a connection area or bond area between the battery cell 210 and the connecting bar 220. More specifically, the welding region 230 may be formed between the battery cell 210 and the connecting bar 220 in a substantially elliptical shape. In particular, the welding region 230 may include a nugget region 231, and a corona bond region 232 formed outside the nugget region 231. More specifically, the nugget region 231 is an area coagulating after melting at the bond region as the result of welding, and is formed around a bond surface in a substantially stone checkers piece shaped. In addition, the corona bond region 232 is an area existing around the nugget region 231, which is not practically melted but is compressively bonded in a solid phase in the presence of heat and pressure. In addition, the welding region 230 is made of nickel (Ni) of the connecting bar 220, steel of the battery cell 210, and gold (Au) and nickel (Ni) of the anisotropic conductive film 240, mixed altogether. That is to say, when forming the welding region 230, not only nickel (Ni) of the connecting bar 220 and steel of the battery cell 210 but also conductive balls 242 of the anisotropic conductive film 240 in the vicinity thereof are melted. Thus, the welding region 230 includes nickel, steel and gold mixed altogether.

The anisotropic conductive film 240 is formed at the outer periphery of the welding region 230, and attaches the battery cell 210 and the connecting bar 220 to each other electrically and mechanically. In particular the heat applied during formation of the welding region 230 further improves an adhesive force of the anisotropic conductive film 240. In addition, the conductive balls 242 of the anisotropic conductive film 240 is melted into the welding region 230, while the conductive balls 242 of the anisotropic conductive film 240 existing in the vicinity of the welding region 230 serve to electrically connect the connecting bar 220 and the battery cell 210 to each other.

Here, an area of the anisotropic conductive film 240 may be approximately 6 to 10 times of an area of the welding region 230. When the area of the anisotropic conductive film 240 is less than approximately 6 times of the area of the welding region 230, electrical and mechanical adhesiveness of the anisotropic conductive film 240 applied between the battery cell 210 and the connecting bar 220 is not greatly improved. When the area of the anisotropic conductive film 240 is greater than approximately 10 times of the area of the welding region 230, an excessively large amount of the anisotropic conductive film 240 may be used, undesirably increasing the cost.

For example, when a diameter of a welding region is 0.1 cm, the area of the welding region is calculated in the following manner:

$$\text{Area of welding region: } 0.05*0.05*3.14=0.00785 \text{ cm}^2 \quad (1)$$

Here, a diameter of the anisotropic conductive film, including the welding region, is set to approximately 0.3 cm.

$$\text{Area of anisotropic conductive film: } 0.15*0.15*3.14=0.07065 \text{ cm}^2 \quad (2)$$

The area of only the anisotropic conductive film, excluding the area of the welding region is calculated in the following manner:

$$(2)-(1)=0.0628 \text{ cm}^2$$

Therefore, it is understood that the area of the anisotropic conductive film is approximately 8 times of the area of the welding region. Conclusively, the calculation results showed that the area of the anisotropic conductive film may be appropriately set to be approximately 6 to 10 times of the area of the welding region.

As described above, the connecting bar 220 can be electrically and mechanically connected to the battery cell 210 using the welding region 230 and the anisotropic conductive film 240, thereby further improving a coupling force between the battery cell 210 and the connecting bar 220. In addition, a battery pack adopting the connecting structure 200 between the battery cell 210 and the connecting bar 220 may become more reliable. For example, the accelerated life, vibration resistance and shock resistance of the battery pack can be greatly improved.

As illustrated in FIG. 4B, the anisotropic conductive film 240 includes an adhesive 241, and a plurality of conductive balls 242 distributed in the adhesive 241. Here, the conductive balls 242 includes a first polymer 242a, a nickel layer 242b surrounding the first polymer 242a, a gold layer 242c surrounding the nickel layer 242b, and a second polymer 242d surrounding the gold layer 242c. A pressed portion of the anisotropic conductive film 240 is changed into a conductive portion, while a non-pressed portion of the anisotropic conductive film 240 still has an insulating property. That is to say, when a pressure is applied to the anisotropic conductive film 240, the conductive balls 242 in the pressed portion collide with each other, so that the second polymer 242d of the conductive balls 242 is stripped off. Accordingly, the conductive balls 242 in the pressed portion are electrically connected to each other, thereby making the pressed portion conductive.

Figure 5:
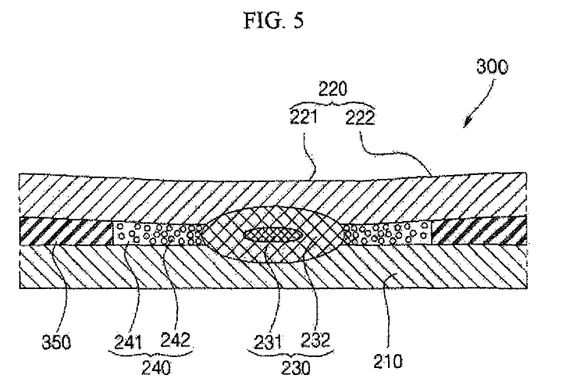
FIG. 5 is a partial cross-sectional view illustrating a connecting structure between a battery cell and a connecting bar according to another embodiment of the present invention.

FIG. 5 is a partial cross-sectional view illustrating a connecting structure between a battery cell and a connecting bar according to another embodiment of the present invention.

As illustrated in FIG. 5, the connecting structure 300 between a battery cell 210 and a connecting bar 220 according to another embodiment of the present invention further includes a welding reinforcement portion 350 formed at the outer periphery of an anisotropic conductive film 240. The welding reinforcement portion 350 mechanically connects the battery cell 210 to the connecting bar 220 at the outer periphery of the anisotropic conductive film 240, thereby further improving a coupling force between the battery cell 210 and the connecting bar 220. For example, the welding reinforcement portion 350 may be made of one selected from an insulating adhesive, a conductive adhesive and equivalents thereof, but aspects of the present invention are not limited thereto. Alternatively, the welding reinforcement portion 350 may be made of one selected from a double-sided adhesive tape and equivalents thereof, but aspects of the present invention are not limited thereto.

As described above, in the connecting structure 300 between the battery cell 210 and the connecting bar 220 according to the illustrated embodiment of the present invention, the battery cell 210 and the connecting bar 220 are additionally connected to each other by the welding reinforcement portion 350, thereby further improving a coupling force between the battery cell 210 and the connecting bar 220.

FIGS. 6A through 6D are partial cross-sectional views illustrating a method of connecting a battery cell and a connecting bar according to an embodiment of the present invention, and the operation thereof.

Figure 6A:
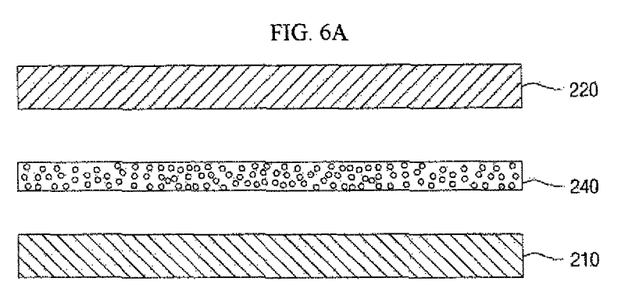
FIGS. 6A through 6D are partial cross-sectional views illustrating a method of connecting a battery cell and a connecting bar according to an embodiment of the present invention, and the operation thereof.

First, as illustrated in FIG. 6A, a stacked structure of a battery cell 210, an anisotropic conductive film 240 and a connecting bar 220 is prepared. For example, the anisotropic conductive film 240 may be connected to the battery cell 210, and the connecting bar 220 may be connected to the anisotropic conductive film 240. Alternatively, the anisotropic conductive film 240 may be connected to the connecting bar 220, and the anisotropic conductive film 240 may be connected to the battery cell 210.

Here, the connecting bar 220 may be shaped of a substantially flat planar plate.

Figure 6B:
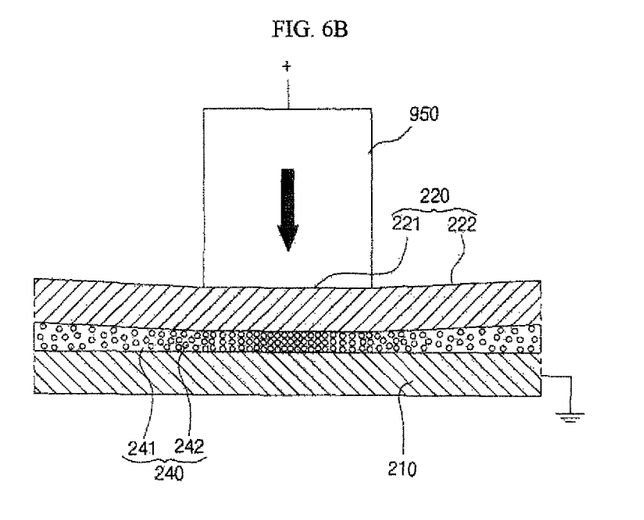

Next, as illustrated in FIG. 6B, for example, a top surface of the connecting bar 220 is pressed by the welding region 950, to which a plus power supply is applied. Here, the battery cell 210 is grounded. Thus, the connecting bar 220 has a planar portion 221 and a sloping portion 222 as a result of the applied pressure and power.

As described above a portion of the anisotropic conductive film 240, corresponding to the pressed portion, is changed into a conductive portion. Accordingly, current flows from the welding region 950 to the connecting bar 220, the anisotropic conductive film 240, and to the battery cell 210, and welding is then started.

Figure 6C:
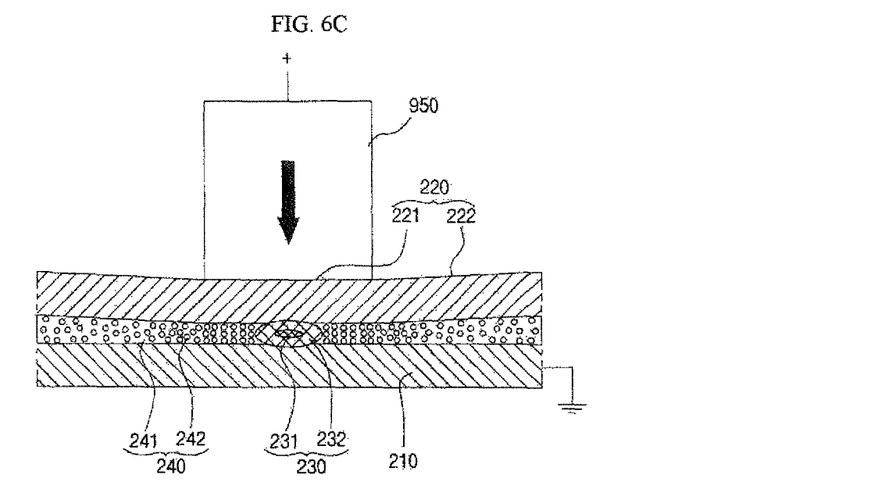
Figure 6D:
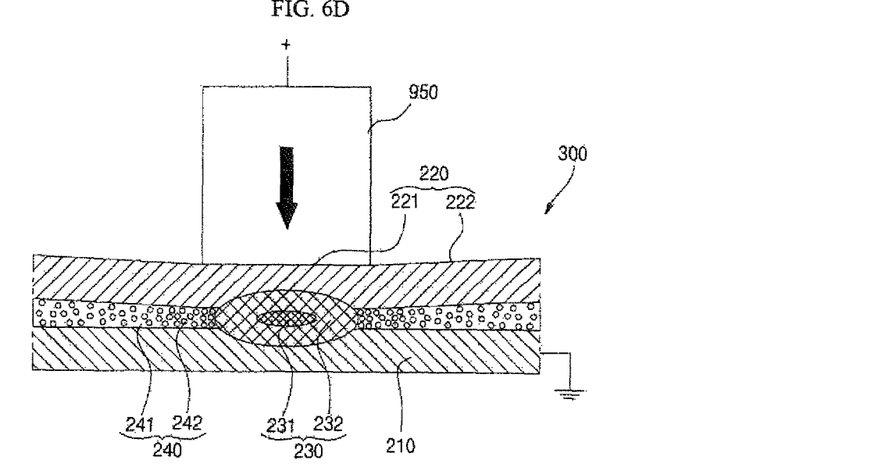

As illustrated in FIGS. 6C and 6D, as the current flows from the welding region 950 to the battery cell 210, the connecting bar 220, the anisotropic conductive film 240 and the battery cell 210 in a region corresponding to the current flow path start to be melted, thereby gradually increasing an area of the welding region 230. That is to say, a nugget region 231 and a corona bond region 232, which form the welding region 230, are gradually enlarged. The welding region 230 is formed by melting nickel (Ni) of the connecting bar 220, steel of the battery cell 210, and a conductor (i.e., Ni and Au) of the anisotropic conductive film 240 altogether.

In addition, the heat applied from the welding region 230 is delivered to the anisotropic conductive film 240, thereby further improving an adhesive force of the anisotropic conductive film 240. Further, when pressure and heat are applied to the conductive balls 242 of the anisotropic conductive film 240 existing in the vicinity of the welding region 230, the second polymer 242d surrounding the conductive balls 242 is stripped off by the pressure and heat based on the welding region 950, thereby electrically and mechanically connecting the connecting bar 220 and the battery cell 210 to each other.

Figure 7A:
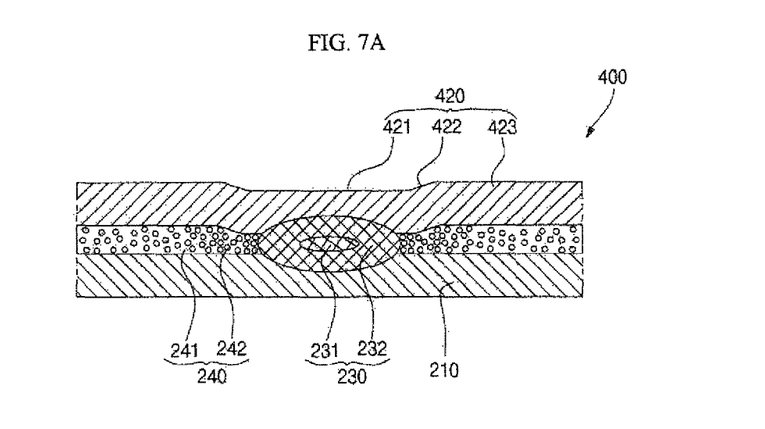
FIGS. 7A and 7B are partial cross-sectional views illustrating a connecting structure between a battery cell and a connecting bar according to another embodiment of the present invention.
Figure 7B:
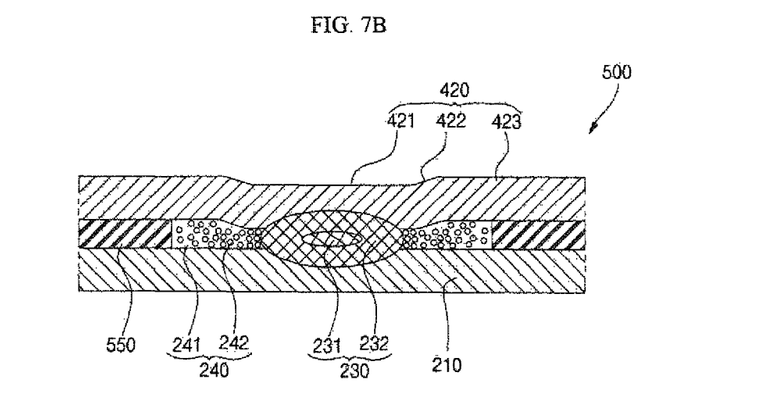

FIGS. 7A and 7B are partial cross-sectional views illustrating a connecting structure between a battery cell and a connecting bar according to another embodiment of the present invention.

As illustrated in FIG. 7A, in the connecting structure 400 between a battery cell 210 and a connecting bar 420 according to the illustrated embodiment of the present invention, the connecting bar 420 is preformed to include a first planar portion 421, a sloping portion 422, and a second planar portion 423.

The first planar portion 421 is formed substantially flatly at a region corresponding to a common welding region 230 formed in the battery cell 210, the connecting bar 420 and the anisotropic conductive film 240.

The sloping portion 422 is upwardly bent by a predetermined angle around the first planar portion 421.

The second planar portion 423 is formed substantially flatly such that it is horizontally bent around the sloping portion 422.

As described above, in the connecting structure 400 between the battery cell 210 and the connecting bar 420 according to the illustrated embodiment of the present invention, since the connecting bar 420 includes the first planar portion 421, the sloping portion 422, and the second planar portion 423 formed in advance, the anisotropic conductive film 240 is relatively intensely pressed, thereby better forming a flow path of welding current. Moreover, the welding region 950 is guided by the sloping portion 422 to then be stably positioned in the first planar portion 421, thereby forming the welding region 230 at an accurate location all the time.

As illustrated in FIG. 7B, a connecting structure 500 between the battery cell 210 and the connecting bar 420 according to other embodiment of the present invention further includes a welding reinforcement portion 550 formed at the outer periphery of the anisotropic conductive film 240. The welding reinforcement portion 550 is formed at a location substantially corresponding to the second planar portion 423. That is to say, the welding reinforcement portion 550 substantially connects the second planar portion 423 of the connecting bar 420 and the battery cell 210 to each other.

The welding reinforcement portion 550 may be made of one selected from an insulating adhesive, a conductive adhesive and equivalents thereof, but aspects of the present invention are not limited thereto. Alternatively, the welding reinforcement portion 550 may be made of one selected from a double-sided adhesive tape and equivalents thereof, but aspects of the present invention are not limited thereto.

As described above, in the connecting structure 500 between the battery cell 210 and the connecting bar 420 according to the illustrated embodiment of the present invention, the battery cell 210 and the connecting bar 420 are additionally connected to each other by the welding reinforcement portion 550, thereby further improving a coupling force between the battery cell 210 and the connecting bar 420.

Figure 8A:
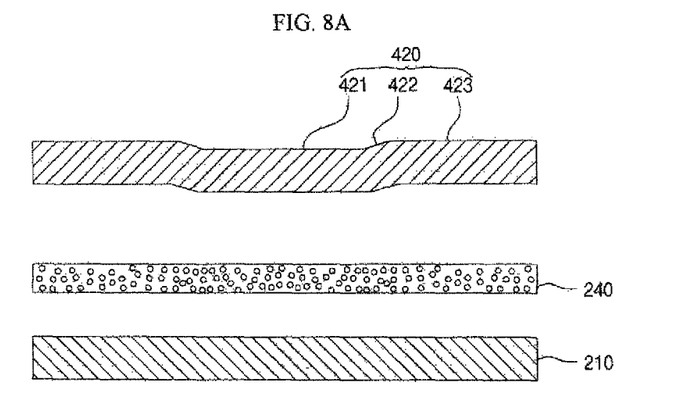
FIGS. 8A and 8B are partial cross-sectional views illustrating a method of connecting a battery cell and a connecting bar according to another embodiment of the present invention, and the operation thereof.
Figure 8B:
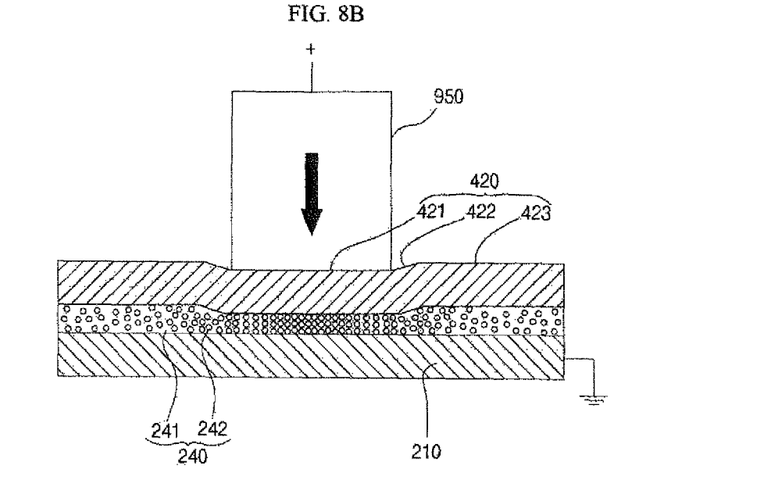

FIGS. 8A and 8B are partial cross-sectional views illustrating a method of connecting a battery cell and a preformed connecting bar according to the above described embodiment of the present invention, and the operation thereof.

First, as illustrated in FIG. 8A, a stacked structure of a battery cell 210, an anisotropic conductive film 240 and a connecting bar 420 is prepared. For example, the anisotropic conductive film 240 may be connected to the battery cell 210, and the connecting bar 420 may be connected to the anisotropic conductive film 240. Alternatively, the anisotropic conductive film 240 may be connected to the connecting bar 420, and the anisotropic conductive film 240 may be connected to the battery cell 210.

Here, the connecting bar 420 may include a first planar portion 421, a sloping portion 422, and a second planar portion 423.

Next, as illustrated in FIG. 8B, for example, a top surface of the connecting bar 420 is pressed by the welding region 950, to which a plus power supply is applied. That is to say, the first planar portion 421 of the connecting bar 420 is pressed by the welding region 950. Here, the welding region 950 is guided by the sloping portion 422, thereby allowing the welding region 950 to be accurately positioned in the first planar portion 421. Here, the battery cell 210 is grounded.

Therefore, a portion of the anisotropic conductive film 240, corresponding to the first planar portion 421, is changed into a conductive portion. Accordingly, current flows from the welding region 950 to the connecting bar 420, the anisotropic conductive film 240, and to the battery cell 210, and welding is then started.

Since the welding operation that follows is the same as described above, an explanation thereof will be omitted.

As described above, according to the illustrated embodiment, since the first planar portion 421, the sloping portion 422 and the second planar portion 423 are formed in advance in the connecting bar 420, the anisotropic conductive film 240 is relatively intensely pressed by the first planar portion 421, thereby better forming a flow path of welding current. Moreover, the welding region 950 is guided by the sloping portion 422 to then be stably positioned in the first planar portion 421, thereby forming the welding region 230 at an accurate location.

Figure 9A:
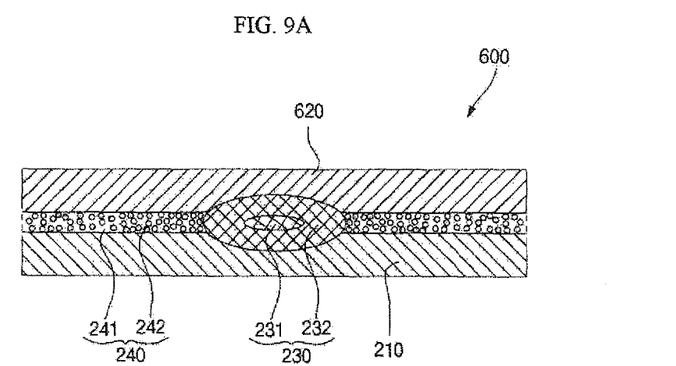
FIGS. 9A and 9B are partial cross-sectional views illustrating a connection relationship between a battery cell and a connecting bar according to another embodiment of the present invention.
Figure 9B:
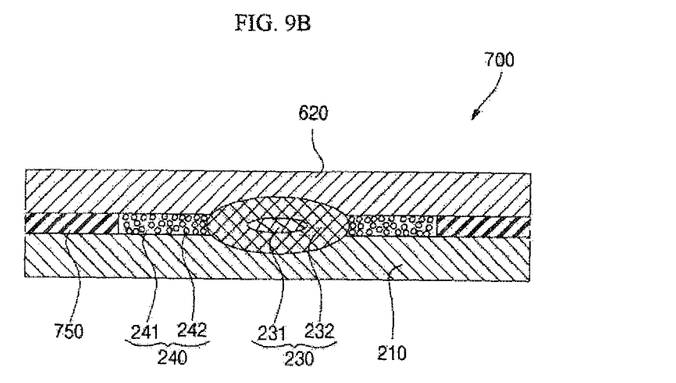

FIGS. 9A and 9B are partial cross-sectional views illustrating a connection relationship between a battery cell and a connecting bar according to yet another embodiment of the present invention.

As illustrated in FIG. 9A, in a connecting structure 600 between a battery cell 210 and a connecting bar 620 according to the illustrated embodiment of the present invention, the connecting bar 620 is formed in a substantially flat shape. That is to say, portions of the connecting bar 620, corresponding to the welding region 230 and the outer periphery of the welding region 230, are both flatly formed.

As described above, in the connecting structure 600 between the battery cell 210 and the connecting bar 620 according to the illustrated embodiment of the present invention, since the connecting bar 620 is formed substantially flatly, an aesthetically pleasing appearance can be achieved. That is to say, a surface of the connecting bar 620 is not uneven but is flat, thereby achieving an aesthetically pleasing appearance and suppressing the connecting bar 620 from getting stuck with other components or members during the manufacturing process.

As illustrated in FIG. 9B, a connecting structure 700 between a battery cell 210 and a connecting bar 620 according to the illustrated embodiment of the present invention further includes a welding reinforcement portion 750 formed at the outer periphery of the anisotropic conductive film 240. The welding reinforcement portion 750 substantially connects the connecting bar 620 and the battery cell 210 to each other.

The welding reinforcement portion 750 may be made of one selected from an insulating adhesive, a conductive adhesive and equivalents thereof, but aspects of the present invention are not limited thereto. Alternatively, the welding reinforcement portion 750 may be made of one selected from a double-sided adhesive tape and equivalents thereof, but aspects of the present invention are not limited thereto.

As described above, in the connecting structure 700 between the battery cell 210 and the connecting bar 620 according to the illustrated embodiment of the present invention, the battery cell 210 and the connecting bar 620 are additionally connected to each other by the welding reinforcement portion 750, thereby further improving a coupling force between the battery cell 210 and the connecting bar 620.

Figure 10A:
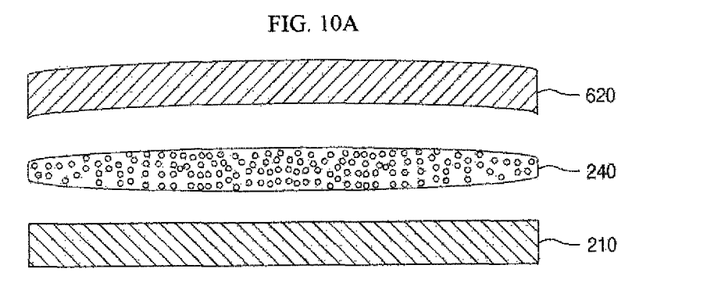
FIGS. 10A and 10B are partial cross-sectional views illustrating a method of connecting a battery cell and a connecting bar according to another embodiment of the present invention, and the operation thereof.
Figure 10B:
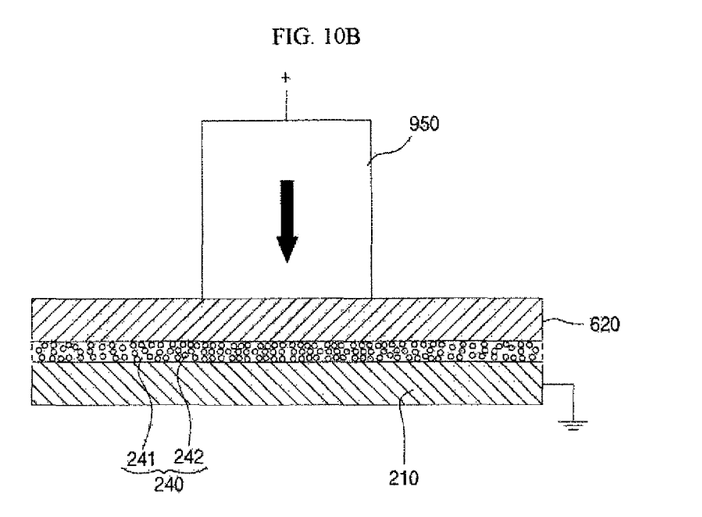

FIGS. 10A and 10B are partial cross-sectional views illustrating a method of connecting a battery cell and a preformed connecting bar according to the above embodiment of the present invention, and the operation thereof.

First, as illustrated in FIG. 10A, a stacked structure of a battery cell 210, an anisotropic conductive film 240 and a connecting bar 620 is prepared. For example, the anisotropic conductive film 240 may be connected to the battery cell 210, and the connecting bar 620 may be connected to the anisotropic conductive film 240. Alternatively, the anisotropic conductive film 240 may be connected to the connecting bar 620, and the anisotropic conductive film 240 may be connected to the battery cell 210.

Here, the connecting bar 620 may be preformed in a substantially upwardly convex shape. In addition, the anisotropic conductive film 240 may be formed in substantially upwardly and downwardly convex shapes.

Next, as illustrated in FIG. 10B, for example, a top surface of the connecting bar 620 is pressed by a welding region 950, to which a plus power supply is applied. Here, the battery cell 210 is grounded. Thus, the connecting bar 620 is shaped to be substantially planar as a whole as a result of the applied pressure and power.

As described above, a portion of the anisotropic conductive film 240, corresponding to the pressed portion, is changed into a conductive portion. Accordingly, current flows from the welding region 950 to the connecting bar 620, the anisotropic conductive film 240, and to the battery cell 210, and welding is then started.

Since the welding operation that follows is the same as described previously, a description thereof will be omitted.

As described above, according to the illustrated embodiment, the connecting bar 620 that is upwardly convex is formed in advance, and is then subjected to welding to make the connecting bar 620 substantially flat, thereby achieving a battery pack including the connecting bar 620 having an aesthetically pleasing appearance.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack comprising:
   at least one battery cell;
   a connecting bar electrically and adhesively connected to the battery cell; and an anisotropic conductive film disposed between the battery cell and the connecting bar, the anisotropic conductive film having a first surface directly attached to the battery cell and an opposing second surface directly attached to the connecting bar;
   an electric bonding region electrically connecting the battery cell and the connecting bar using welding, wherein the connecting bar includes a planar portion formed at a location corresponding to the electric bonding region, and a sloped portion upwardly bent around the planar portion, the anisotropic conductive film having conductivity only in a direction corresponding to a thickness direction of the anisotropic conductive film in the electric bonding region.

2. The battery pack of claim 1, the anisotropic conductive film comprising:
   an outer periphery region, formed at an outer periphery of the electric bonding region and connecting the battery cell and the connecting bar to each other.

3. The battery pack of claim 2, further comprising a welding reinforcement member formed at an outer periphery of the anisotropic conductive film, the welding reinforcement member connecting the battery cell and the connecting bar to each other.

4. The battery pack of claim 3, wherein the welding reinforcement member is an insulating adhesive.

5. The battery pack of claim 3, wherein the welding reinforcement member is a double-sided adhesive tape.

6. The battery pack of claim 2, wherein an area of the outer periphery region is larger than that of the electric bonding region.

7. The battery pack of claim 2, wherein the outer periphery region electrically connects the battery cell and the connecting bar to each other.

8. The battery pack of claim 2, wherein the electric bonding region is elliptically shaped.

9. The battery pack of claim 2, wherein the electric bonding region is made of nickel (Ni) of the connecting bar, steel of the battery cell, and gold (Au) and nickel (Ni) of the anisotropic conductive film, mixed altogether.

10. The battery pack of claim 2, wherein the electric bonding region includes a nugget region that is a trace of current flow based on a welding region; and a corona bond region formed outside the nugget region by melting and curing of the nugget region.

11. The battery pack of claim 2, wherein the connecting bar includes a second planar portion horizontally bent about the sloping portion.

12. The battery pack of claim 1, wherein the connecting bar is flatly formed.

13. The battery pack of claim 2, an electrical conductivity of the electric bonding region is higher than that of the outer periphery region of the anisotropic conductive film.

14. The battery pack of claim 13, wherein the anisotropic conductive film includes:
   an adhesive; and
   a plurality of conductive balls distributed in the adhesive, the conductive balls comprising a first polymer, a nickel layer surrounding the first polymer, a gold layer surrounding the nickel layer, and a second polymer surrounding the gold layer.

* * * * *